United States Patent
Jung

(10) Patent No.: US 8,531,605 B2
(45) Date of Patent: Sep. 10, 2013

(54) METHOD AND APPARATUS FOR OUTPUT SETTING IN A PORTABLE TERMINAL

(75) Inventor: Sung-Kwon Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 375 days.

(21) Appl. No.: 12/764,203

(22) Filed: Apr. 21, 2010

(65) Prior Publication Data

US 2010/0271544 A1    Oct. 28, 2010

(30) Foreign Application Priority Data

Apr. 22, 2009  (KR) .................. 10-2009-0034898

(51) Int. Cl.
*H04N 5/46* (2006.01)
*H04N 5/64* (2006.01)

(52) U.S. Cl.
USPC .......................................... 348/555; 348/838

(58) Field of Classification Search
USPC .............. 348/553–555, 558, 725, 726, 837, 348/838, 14.02, 14.04, 333.01, 376, 552; 701/408, 491, 468, 523, 541; 455/351, 337, 455/456.1, 456.6, 3.06

See application file for complete search history.

(56) References Cited

U.S. PATENT DOCUMENTS

| | | | |
|---|---|---|---|
| 7,958,536 B2 * | 6/2011 | Gordon et al. ................ | 725/116 |
| 8,064,747 B2 * | 11/2011 | Amano et al. ................ | 386/239 |
| 2006/0214001 A1 * | 9/2006 | Chuang et al. ............ | 235/472.01 |
| 2009/0009609 A1 * | 1/2009 | Maeda ........................ | 348/207.1 |
| 2009/0061841 A1 * | 3/2009 | Chaudhri et al. ............ | 455/420 |
| 2009/0136211 A1 * | 5/2009 | Kikukawa et al. ............ | 386/117 |
| 2010/0080413 A1 * | 4/2010 | Chen et al. .................... | 382/100 |

* cited by examiner

*Primary Examiner* — Victor Kostak
(74) *Attorney, Agent, or Firm* — Cha & Reiter, LLC.

(57) ABSTRACT

An apparatus and method for providing an output setting in a portable terminal includes an external output setting unit and a controller. If a connection with an external device is determined, the external output setting unit determines an output format supported by the external device. The controller automatically changes system setting suitably to the determined output format of the external device.

10 Claims, 3 Drawing Sheets

METHOD AND APPARATUS FOR OUTPUT SETTING IN A PORTABLE TERMINAL

CLAIM OF PRIORITY

This application claims priority under 35 U.S.C. §119(a) from a Korean patent application filed in the Korean Intellectual Property Office on "Apr. 22, 2009" and assigned Serial No. "10-2009-0034898", the entire disclosure of which is hereby incorporated by reference in its entirety.

BACKGROUND OF THE INVENTION

1. Field of the Invention

The present invention relates to a portable terminal in connection with an external device. More particularly, the present invention relates to an apparatus and method for converting data format to be supported by an external device.

2. Description of the Related Art

With the rapid development of portable terminals, the portable terminals have become widely used as necessities to modern people and readily provide a wireless voice call and information exchange.

In the beginning, the portable terminals were simply enabled a wireless call. However, as their technologies are developed, a service provider or a terminal manufacturer is competitively developing a product (or a service) for the differentiation from other enterprises.

For example, the portable terminals are evolving into multimedia device covering services related to phone books, games, short messages, electronic mail (e-mail) messages, morning wakeup calls, MPEG-1 Audio Layer 3 (MP3) players, schedule management functions, digital cameras, and wireless Internet services to provide a variety of services. Recently, with the development of an image data processing technology and an increase in the data storage capacity, even the portable terminals can now readily display multimedia images, etc.

In order to provide the above functions of the portable terminals, the portable terminals may need to be connected to an external device. For example, when the portable terminals receive digital broadcasting, a user has to view the digital broadcasting on restricted screens of the portable terminals. To solve the inconvenience, the portable terminals can connect to an external display device such as a Television (TV).

The above method requires a separate cable to connect to the portable terminal supporting external output and to a TV.

However, the TV requires system setting to support a National Television System committee (NTSC) scheme and a Phase Alternation Line (PAL) scheme according to broadcasting standards. Hence, a user has to directly perform the system setting in a manual fashion.

When a system setting format supported by each country is different, a TV will not display a picture correctly. Thus, there is a problem that a user has to perform the TV system setting at great inconvenience.

Accordingly, there is a need for an apparatus and method for, when a portable terminal connects with an external device, performing the system setting supported by the external device.

SUMMARY OF THE INVENTION

An exemplary aspect of the present invention is to provide an apparatus and method for converting data to a data format supported by an external device in a portable terminal that is connected to the external device.

Another exemplary aspect of the present invention is to provide an apparatus and method for enabling data transmission suitable to a data format of an external device supported in an area where a portable terminal is positioned.

Still another exemplary aspect of the present invention is to provide an apparatus and method for receiving position information, determining an area where an external device is positioned, and determining a data format supported by the external device in a portable terminal.

In accordance with an exemplary aspect of the present invention, an apparatus for providing an external output setting of a portable terminal includes an external output setting unit and a controller. If a connection with an external device is determined, the external output setting unit determines an output format supported by the external device. The controller automatically changes system setting suitably to the determined output format of the external device.

In accordance with another exemplary aspect of the present invention, a method for providing an external output setting of a portable terminal includes determining an output format supported by the external device if determining a connection with an external device, and automatically changing system setting suitably to the determined output format of the external device.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

The following description, with reference to the accompanying drawings, is provided to assist in a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. Also, descriptions of well-known functions and constructions may be omitted for clarity and conciseness when their inclusion may obscure appreciation of the subject matter of the claimed invention by a person or ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The following description is made for an apparatus and method for converting data to a data format supported by an external device in a portable terminal connecting with the external device according to an exemplary embodiment of the present invention.

In the following description, the portable terminal means the inclusion of all types of mobile communication terminals such as cellular phones, Personal Communications Service (PCS) phones, and Personal Digital Assistant (PDA) phones. The external device represents a device such as an audio system, a TV system, and a Personal Computer (PC) capable of connecting with the portable terminal and receiving data of the portable terminal.

Figure 1:
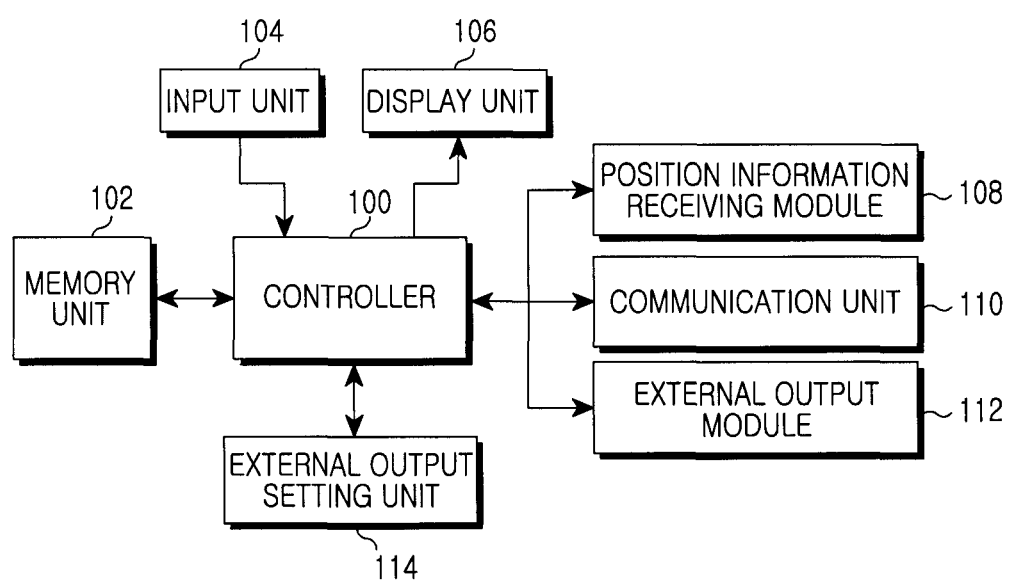
FIG. 1 is a block diagram illustrating a construction of a portable terminal connecting with an external device according to an exemplary embodiment of the present invention.

FIG. 1 is a block diagram illustrating a construction of a portable terminal in connection with an external device according to an exemplary embodiment of the present invention, Referring to FIG. 1, the portable terminal may include a controller 100, a memory unit 102, an input unit 104, a display unit 106, a position information receiving module 108, a communication unit 110, an external output module 112, and an external output setting unit 114.

The controller 100 of the portable terminal controls a general operation of the portable terminal. For example, the controller 100 performs a process and control for voice telephony and data communication. In addition to a general function, when determining a connection with an external device, the controller 100 processes to convert output data to a data format supported by the external device according to the present invention.

Accordingly, the controller 100 processes to convert data of the portable terminal to the format supported by the external device and transmit the converted data to the external device.

In order to perform the above operation, the controller 100 determines the format supported by the external device when connecting with the external device. For instance, the controller 100 may determine a format supported by a Television (TV) of a corresponding area by receiving position information (e.g., Base Station (BS) information, a satellite signal, time information, and the like.), acquiring information on the corresponding area, then determining an output format of a TV system by area.

The memory unit 102 of the portable terminal preferably includes, for example, a Read Only Memory (ROM), a Random Access Memory (RAM), a flash ROM, and the like. The ROM stores a microcode of a program for processing and controlling the controller 100, the external output setting unit 114, and a variety of reference data.

The RAM as a working memory of the controller 100, stores temporary data generated during execution of a variety of programs. The flash ROM stores a diversity of updateable depository data such as a phone book, an outgoing message, an incoming message, information on a point of a user's touch input, and the like.

The input unit 104 includes numeral key buttons '0' to '9', a menu button, a cancel button, an OK button, a talk button, an end button, an Internet button, navigation key (or direction key) buttons, a plurality of function keys such as a character input key, and the like. The input unit 104 provides key input data corresponding to a key pressed by a user to the controller 100.

The display unit 106 displays state information generated during an operation of the portable terminal 100, limited number of characters, a large amount of moving pictures and still pictures, and the like. The display unit 106 may be a color Liquid Crystal Display (LCD), Active Mode Organic Light Emitting Diode (AMOLED), and the like. The display unit 106 may be used as an input device when equipped with a touch input device.

The position information receiving module 108 refers to a Global Positioning System (GPS) for receiving position information and determining information regarding an area where the portable terminal is positioned.

The communication unit 110 performs a function of transmitting/receiving and processing a radio signal of data that is input/output through an antenna (not shown). For example, in a transmission mode, the communication unit 110 processes original data through channel coding and spreading, converts the original data into a Radio Frequency (RF) signal, and transmits the RF signal. In a reception mode, the communication unit 110 converts a received RF signal into a baseband signal, processes the baseband signal through de-spreading and channel decoding, and restores the signal to original data.

The external output module 112, which is a module connecting with the external device, can be an output terminal (TV OUT), for example, in case where the portable terminal connects with a TV system.

Under the control of the controller 100, the external output setting unit 114 determines a data format supported by an external device connected to the portable terminal. Thereafter, the portable terminal processes to convert data of the portable terminal to the data format supported by the external device.

Note that the function of the external output setting unit 114 can be implemented by the controller 100 of the portable terminal. Moreover, the process of modules and units shown in FIG. 1 can be achieved via the controller 100.

Figure 2:
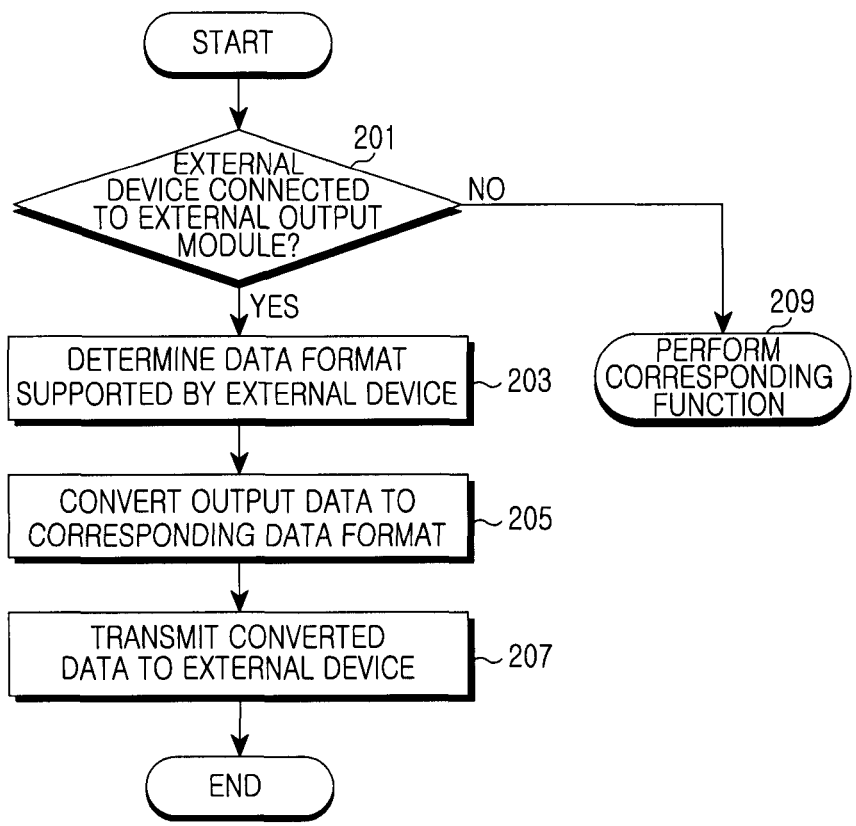
FIG. 2 is a flowchart illustrating an exemplary operational process of outputting data to an external device in a portable terminal according to an exemplary embodiment of the present invention.

FIG. 2 is a flowchart diagram illustrating an exemplary process of outputting data to an external device in a portable terminal according to an exemplary embodiment of the present invention.

Referring to FIG. 2, in step 201, the portable terminal determines if an external device is connected to an external output module thereof. Here, the external output module refers to an output terminal (e.g., a TV OUT) for connecting the portable terminal with an external device such as a TV, a portable multimedia player, an audio device. Note that TV is used as an external device as illustrative purposes, but it should be noted that teachings of the present invention may be applied to other multimedia devices.

If determining that the external output module is not connected to the external device, that is, the TV OUT is not connected to the TV, the portable terminal proceeds to step 209 and performs a corresponding function (e.g., an idle mode).

If determining that the external output module is connected to the external device in step 201, the portable terminal proceeds to step 203 and determines a data format supported by the external device.

After that, the portable terminal proceeds to step 205 and converts data to the data format supported by the external device for transmission to the external device. That is, step 205 is a process of converting a music file supported by the portable terminal to a specific file supported by an audio device, or converting image data supported by the portable terminal to a specific file supported by a portable multimedia player or a file corresponding to a specific resolution. Also, when a user intends to connect previously stored digital broadcasting to a TV for replay, the portable terminal can convert the prestored digital broadcasting to data of a system scheme (i.e., a National Television System committee (NTSC) or Phase Alternation Line (PAL) scheme) supported by the TV.

After the conversion, the portable terminal proceeds to step 207 and transmits the converted data to the external device. Thereafter, the portable terminal terminates the process according to the exemplary embodiment of the present invention.

Figure 3:
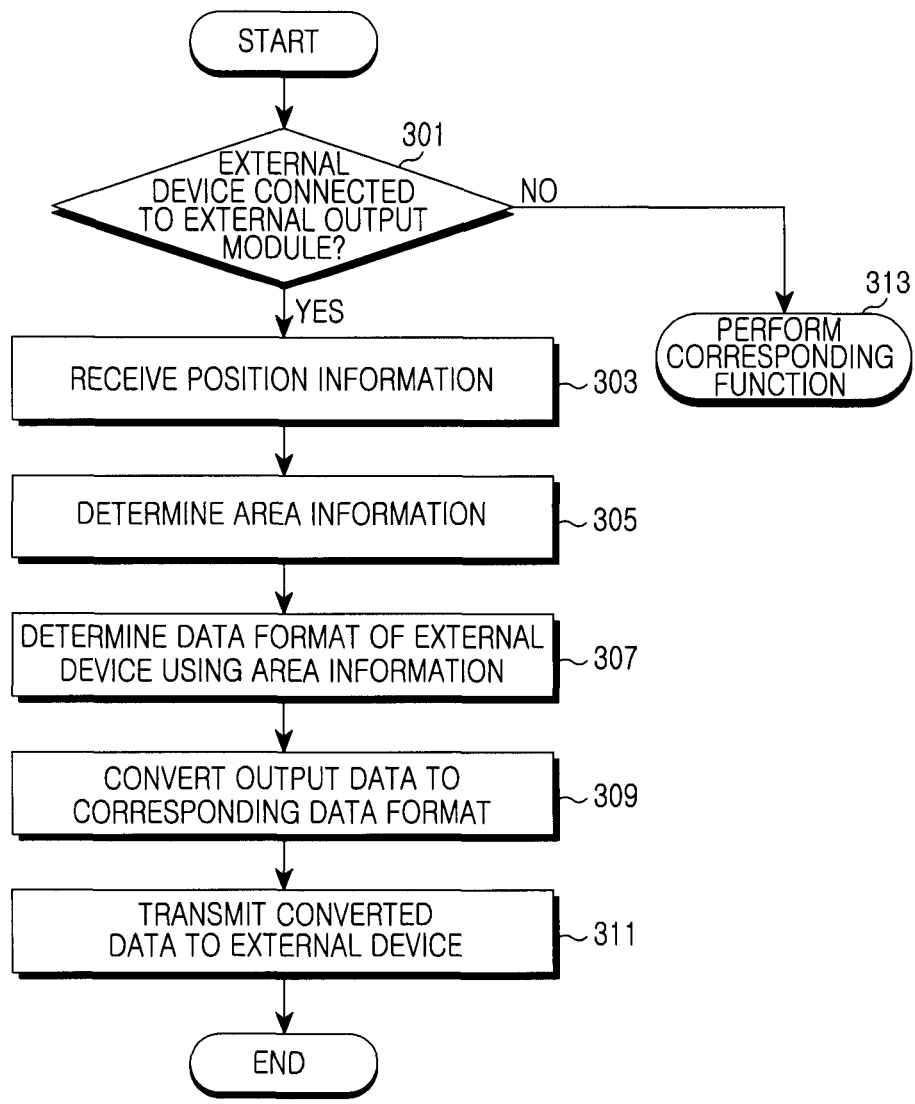
FIG. 3 is a flowchart illustrating an exemplary operational process of converting data suitably to TV system setting supported by country in a portable terminal according to an exemplary embodiment of the present invention.

FIG. 3 is a flowchart diagram illustrating an exemplary process of converting data suitably to TV system setting supported by a particular country according to an exemplary embodiment of the present invention.

Referring to FIG. 3, in step 301, the portable terminal determines if an external output module is connected to an external device. FIG. 3 illustrates an example in which the portable terminal is connected to a TV system, but it should be noted that the portable terminal may be coupled to other multimedia devices.

If determining that the external output module is not connected to the external device in step 301, the portable terminal can proceed to step 313 and perform a corresponding function (e.g., an idle mode).

If the external device is detected in step 301, the portable terminal can proceed to step 303 and receive position information. Here, reasons for receiving the position information is to determine whether a format supported by the TV system and a format of data from the portable terminal matches based on location of the portable terminal. The portable terminal can use position information such as a satellite signal, BS information, time information by country, etc.

In step 305, the portable terminal determines its position information using the received position information. Then, in step 307, the portable terminal determines a data format of the external device (e.g., the TV system) using the determined area information of step 305. That is, the portable terminal stores output formats of TV systems by the area. Thus, the terminal can, based on the determined area information, determine an output format supported in a particular area where the portable terminal is currently positioned. In step 307, the portable terminal determines which one of NTSC and PAL schemes is, for example, supported by the TV system currently in connection with the external output module.

In step 309, the terminal converts data to be output to the external device to a corresponding data format. Then, the portable terminal proceeds to step 311 and transmits the converted data to the external device.

The above description with reference to FIG. 3 is made for an example of connecting a portable terminal of the present invention with a TV system. However, the present invention is applicable when the portable terminal is coupled to an audio system, a portable multimedia player, and a portable game player.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for providing an external output setting of a portable terminal in communication with an external device, comprising:
a controller for determining whether or not the portable terminal is connected to the external device;
a position information receiving module for receiving position information;
an external output setting unit, responsive to the determination by the controller of a connection of the portable terminal with the external device, for automatically determining an output format supported by the external device by receiving the position information from the position information receiving module, and for determining the output format supported by the external device based on the received position information; and
wherein the controller automatically changes a system setting according to the determined output format supported by the external device and received from the external output setting unit.

2. The apparatus of claim 1, wherein the external output setting unit receives the position information from the position information receiving module, and determines whether the output format supported by the external device is a National Television System Committee (NTSC) scheme or a Phase Alternation Line (PAL) scheme based on the position information.

3. The apparatus of claim 1, wherein the controller automatically changes the system setting by changing the external output setting of the portable terminal into the output format supported by the external device.

4. The apparatus of claim 1, wherein the controller converts data of the portable terminal to data of the output format supported by the external device.

5. The apparatus of claim 1, wherein the position information comprises at least any one of a satellite signal, time information, and Base Station (BS) information.

6. A method for providing an external output setting of a portable terminal, the method comprising:
  determining whether or not the portable terminal is connected to an external device;
  in response to the determination of a connection of the portable terminal with the external device, automatically determining, using an external output setting unit, an output format supported by the external device using received position information from a position information receiving module; and
  automatically changing a system setting using a controller according to the determined output format supported by the external device and received from the external output setting unit.

7. The method of claim 6, wherein determining the output format further comprises:
  receiving the position information from the position information receiving module;
  determining area information based on the position information; and
  determining whether the output format supported by the external device is a National Television System Committee (NTSC) scheme or a Phase Alternation Line (PAL) scheme using the area information.

8. The method of claim 6, wherein automatically changing the system setting further comprises:
  changing the external output setting of the portable terminal into the output format supported by the external device.

9. The method of claim 6, wherein automatically changing the system setting further comprises: converting data of the portable terminal to data of the output format supported by the external device.

10. The method of claim 6, wherein the position information comprises at least any one of a satellite signal, time information, and Base Station (BS) information.

* * * * *